United States Patent [19]

Goto et al.

[11] Patent Number: 5,526,079
[45] Date of Patent: Jun. 11, 1996

[54] DATA RECORDING SYSTEM FOR A CAMERA

[75] Inventors: Tetsuro Goto, Funabashi; Kosho Miura, Kamakura, both of Japan

[73] Assignee: Nikon Corporation, Tokyo, Japan

[21] Appl. No.: 536,193

[22] Filed: Sep. 29, 1995

Related U.S. Application Data

[63] Continuation of Ser. No. 202,546, Feb. 28, 1994, abandoned.

[30] Foreign Application Priority Data

Mar. 12, 1993 [JP] Japan ..................................... 5-077474
Apr. 3, 1993 [JP] Japan ..................................... 5-100436

[51] Int. Cl.$^6$ ................................................. G03B 17/24
[52] U.S. Cl. ............................................................. 354/106
[58] Field of Search ..................................... 354/105–109, 354/289.1

[56] References Cited

U.S. PATENT DOCUMENTS 4,989,025  1/1991  Matsumura et al. ..................... 354/106
5,155,513  10/1992  Matsumura et al. ..................... 354/106

*Primary Examiner*—Howard B. Blankenship
*Attorney, Agent, or Firm*—Oliff & Berridge

[57] ABSTRACT

A camera includes a data recording system or databack which records information such as the time, the date, a name and a copyright symbol onto a recording medium used by the camera. The name, time and date data, which must be set by the user, are lost when power to the databack is lost or interrupted. To ensure that incorrect data is not recorded onto the recording medium after a power loss or interruption, a control system of the databack determines if the data to be recorded are in a default state or in an adjusted state. For data in the adjusted state, the control system allows those data to be recorded on the recording medium. For data in the default state, the control system prevents those data from being recorded on the recording medium. Alternately, if any data is in the default state, the control system prevents any data except fixed data, such as the copyright symbol, from being recorded, in one case, or prevents any data from being recorded, in another case. In a further alternative, when any data is in the default state, the control system prevents operation of the camera.

27 Claims, 10 Drawing Sheets

DATA RECORDING SYSTEM FOR A CAMERA

This is a Continuation of application Ser. No. 08/202,546 filed Feb. 28, 1994, now abandoned.

BACKGROUND OF THE INVENTION

1. Field of the Invention

This invention is directed to a data recording system for a databack of a camera. Specifically, this invention is directed to an information recording system which records copyright, name, time and date data on a photographic recording medium. This system is also directed to a system for ensuring the correct date and/or time information is recorded. More specifically, the system is useful for a databack of a camera.

2. Description of Related Art

Heretofore, a databack (data recording system) which is an accessory system of a camera and which records data including date information and copyright information was described in Japanese Patent Application 1991-318631. This data recording system uses an array of light emitting diodes (LEDs) to optically record and/or display date information, time information and/or information including the photographer's name inside or outside of the photographic screen on the film. The date and/or time of the photograph are automatically recorded by this system, making it beneficial when arranging photographs later and with commemorative photographs. This data recording system is also valuable in asserting copyrights because it can automatically record the necessary copyright information on the surface of the film. The data to be recorded is displayed by a liquid crystal display element (LCD) so that the information can be verified by the photographer before it is recorded.

With this kind of data recording system, it is necessary to have an electrical circuit, or timer, which maintains one or more of time data, date data or name data. In general, a microprocessor is used as this electrical circuit, with a liquid crystal oscillator connected to the microprocessor to provide clock signals to the microprocessor. The microprocessor is able to record the correct time by adding these precise clock signals from the liquid crystal oscillator to stored time and date data. In addition, to record the copyright information, a selective memory means which allows the photographer's name to be recorded is also provided using the same microprocessor.

On the other hand, it is necessary to have a reset circuit connected to the microprocessor. This reset circuit resets the microprocessor when a new battery is connected to the databack and current is first supplied after the battery is changed.

When the microprocessor is reset, the time data is measured from an initial value, which is preset in the device. Because the initial value of this time data is set as a time prior to when photographs are actually be taken (a previous date and time), it is necessary for the user to adjust the time data to the correct date and time in a well-known manner whenever the battery is replaced.

With conventional databacks (data recording systems), it is possible for data to be displayed on the film even after the time data is reset as described above. Because of this, the incorrect time data calculated by measuring time from the initial value (a previous date and time) is recorded if the user forgets to make the necessary adjustments.

Furthermore, this resetting problem is not limited to when the battery is replaced, but rather the problem described above can occur spontaneously because the reset circuit also functions at times other than when the battery is replaced, such as when the connection with the battery is broken for an instant due to vibration or when static electric noise enters from the outside. Thus, the user is often not aware that the timer has been reset.

In this kind of circumstance, the wrong time data is displayed if the user does not notice that the time displayed on the external LCD has been reset to a previous value, making both the time/date stop on the photograph wrong and the assertion of copyrights impossible, thereby defeating the main purposes of the device.

SUMMARY OF THE INVENTION

This invention solves the problems discussed above, and eliminates conditions which make copyright assertion impossible by preventing the display of incorrect date and time data and by ensuring that the timer is correctly adjusted before recording data related to time, date and/or copyrights, so that the correct data is always displayed.

In addition, another purpose of this invention is to provide a data recording system which prevents operation of the camera when the time, date and/or name data has been reset and has not been adjusted.

Further, another purpose of this invention is to provide a date and time information recording system which encourages the adjustment of the time data by producing a warning signal when incorrect time data will be recorded onto the surface of the film.

In order to achieve these purposes, a first preferred embodiment of the data recording system of this invention contains a clock means which keeps track of time from a preset date and the elapsed time from installation of the battery, and which generates date and time data, and an alteration means which can be operated from the outside the camera to alter the date and time data. The data recording system has a preset data generation means which generates preset data; a recording means for recording the date and time data and the preset data on a recording medium; a determination means which determines whether or not the date and time data are in a first state with time measured from the preset date and time or in a second state with time measured from the information set by operating the alteration means; and a control means which prevents the recording means from recording date and time data on the recording medium when the determination means determines that the system is in the first state.

In addition, in the first preferred embodiment of the invention, the control means can be set up to allow operation of the recording means to permit only the preset data to be recorded when the determination means determines that the system is in the first state.

Furthermore, in the first preferred embodiment of the invention, the system can be set up to include a warning means which indicates when the determination means determines that the system is in the first state.

In the data recording system, the system prevents the display of date and time data but records the preset data including the data related to copyrights when it detects that the CPU inside the databack (data recording system) has been reset and the date and time data have not been altered from their initial values. In other words, it prevents the display of incorrect date and time data but always displays the data related to copyrights, thereby eliminating conditions which make copyright assertion impossible.

In a second preferred embodiment of this invention, the date and time information recording system is structured so that recording of the date and time information on the recording medium is prevented if the date and time information has not been corrected after the battery is replaced, thereby preventing incorrect date and time information from being recorded on the recording medium (i.e., the photograph, etc.).

DETAILED DESCRIPTION OF THE PREFERRED EMBODIMENTS

Figure 1:
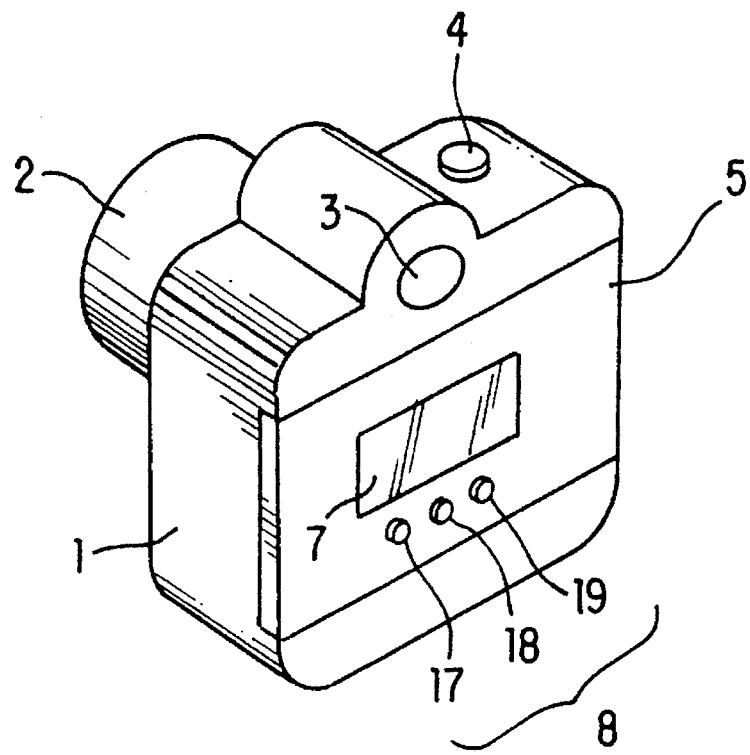
FIG. 1 is an angled view showing a camera with a data recording system.

FIGS. 1–9 shows a first preferred embodiment of this invention. FIG. 1 shows an angled view showing the exterior of a databack 5 mounted on a camera 1. In FIG. 1, the subject of the photograph is seen through the lens 2 mounted on the camera 1 and is visually verified by means of the finder 3. An image of the subject is exposed onto film loaded in the camera when the shutter button 4 is pushed. The databack 5 has several operation buttons 8 and an LCD 7, and is an accessory which allows optical recording of the time data onto the film. The operation buttons 8 are used to arbitrarily adjust the time data displayed by the LCD 7, in a manner that is well known.

In the first preferred embodiment shown in FIG. 1, the operation buttons 8 comprise individual operation buttons 17, 18 and 19. The operation buttons 17, 18 and 19 allow the user to freely adjust and set the year data and name data displayed on the LCD 7.

Figure 2:
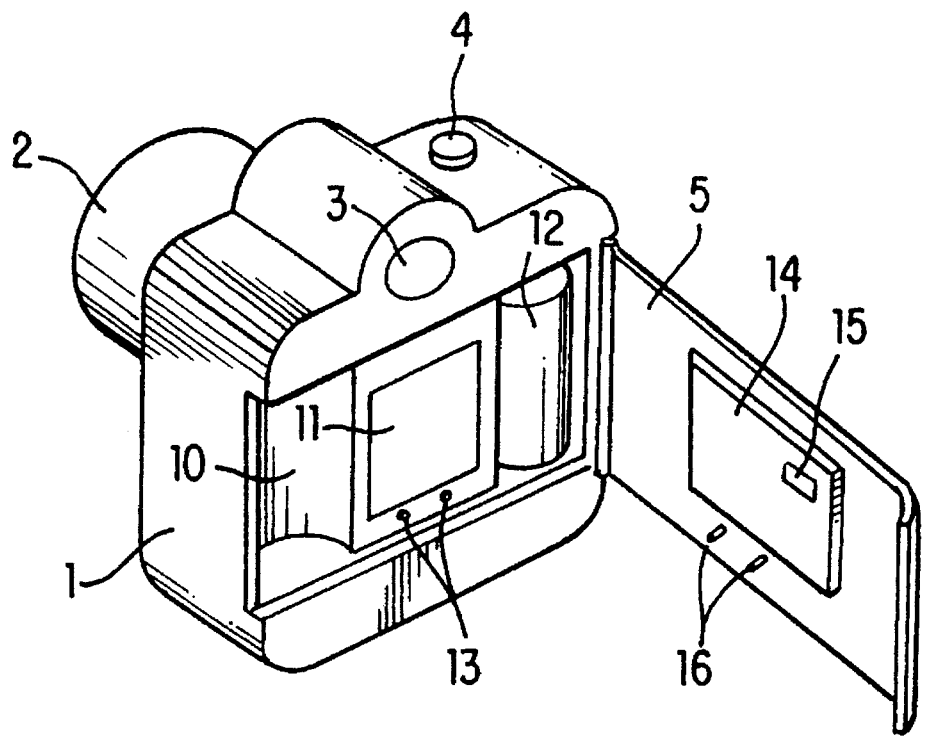
FIG. 2 is an angled view showing the camera of FIG. 1 with the back open.

FIG. 2 is an angled view of the camera shown in FIG. 1 with the databack 5 open. A film cartridge is loaded into the film chamber 10. The film from the film cartridge passes across the aperture 11 as it is wound onto the spool 12. Light from the subject of the photograph passes through the lens 2 and a shutter to form an image on a portion of the film located near the aperture 11. A pressure plate 14 is mounted on the inside of the databack 5. The pressure plate presses the film tight against the aperture 11.

A hole 15 is made in part of the pressure plate 14. The data to be displayed on the film is projected through a hole 15 onto the back surface of the portion of the film and optically recorded.

Display signals that command the display operation of the databack 5 are received through connections 13 which are mounted below the aperture 11 of the camera 1 on the aperture's outside perimeter, and connections 16 which are mounted below the pressure plate 14 on the databack 5.

Figure 3:
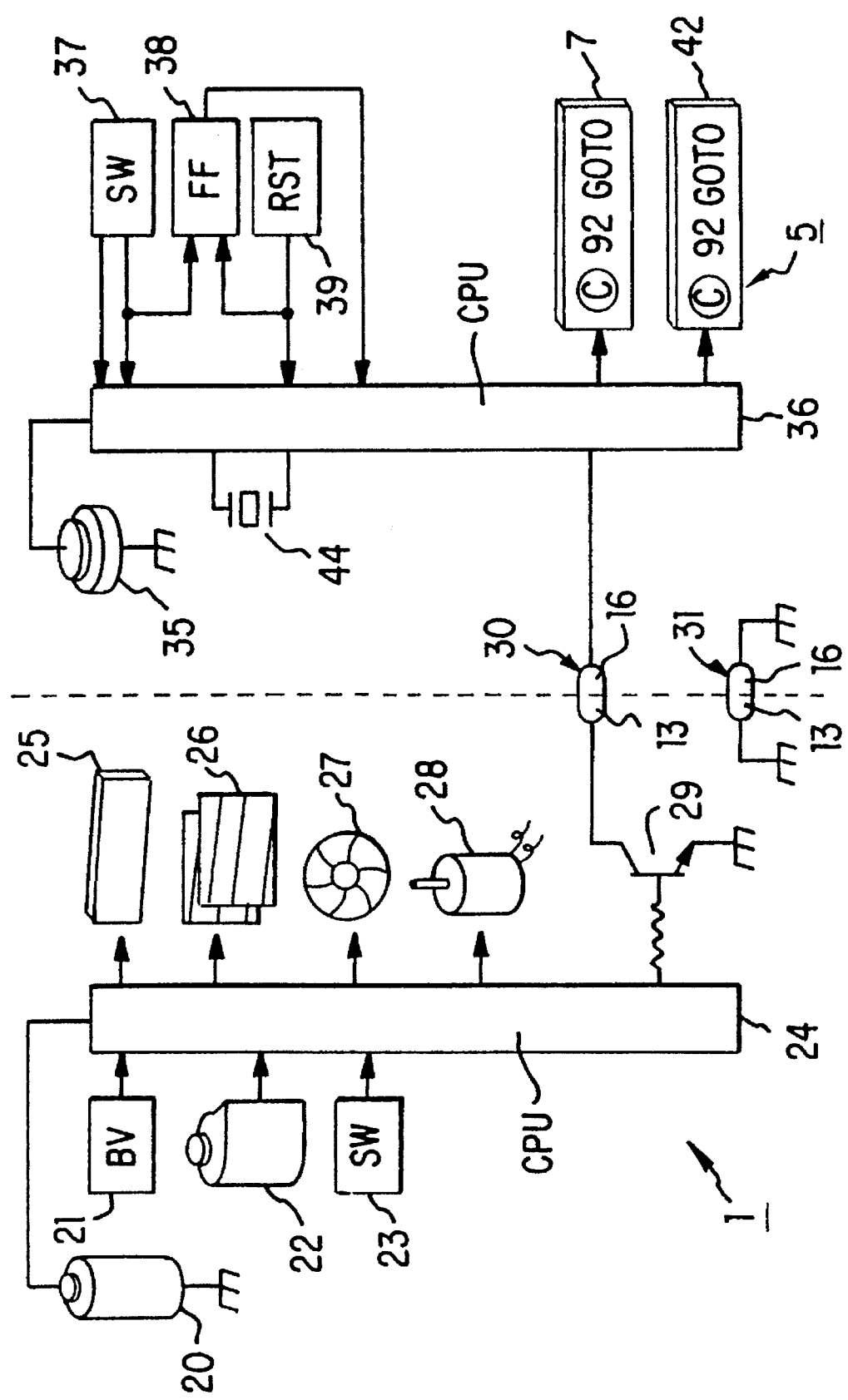
FIG. 3 is a block diagram showing the first preferred embodiment of the data recording system.

FIG. 3 is a block diagram illustrating the first preferred embodiment of the camera 1 and the databack 5. In FIG. 3, the items to the left of the connections 13 correspond to the camera 1, and those to the right of the connections 16 correspond to the databack 5.

Electricity for operating the circuits of the camera 1 is supplied by a battery 20. Control of the camera 1 is executed by the camera microprocessor 24. Subject brightness signals from the photometry circuit 21, film sensitivity signals from the film sensitivity detection circuit 22 and status signals from the various switch status detection circuits 23 are all supplied to the camera microprocessor 24. The switch detection circuits 23 include the power switch linked to the release shutter button 4, the release switch, and the switch which shows the state of the sequence of operations of the camera 1.

The camera microprocessor 24 displays exposure conditions on the LCD 25 mounted inside the view finder 3, exposes the film by opening and closing the shutter 26, adjusts the size of the opening of the diaphragm 27 to control the amount of light which enters the camera 1, and causes the motor 28 to rotate in order to wind and rewind the film. Furthermore, the camera microprocessor 24 drives the transistor 29 with a set timing and executes a display signal output via the connections 13 and 16. Part of each of the connections 13 and 16 is a grounded signal terminal.

A second battery 35 supplies power to the camera including the databack microprocessor 36 of the databack 5. Various signals input into the databack microprocessor 36. First, the on/off status of the operation buttons 17, 18, and 19 is input from the databack switch detection circuit 37. Year data and name data to be recorded can be adjusted by the settings of these operation buttons 17, 18, and 19. Furthermore, a display timing signal is input via the connections 13 and 16. The output of the databack switch detection circuit 37 is also transmitted to the flip flop circuit 38 (hereafter "FF circuit").

A reset signal is input into the databack microprocessor 36 from the reset circuit 39. The reset circuit 39 monitors the voltage of the battery 35, and sends an output signal when it detects the start-up of voltage, such as when the battery 35 is replaced as described above. The output of the reset circuit 39 is also transmitted to the FF circuit 38.

In addition, a liquid crystal oscillator 44 is also connected to the databack microprocessor 36 to supply a precise original oscillation frequency. This oscillator is used as the clock for measuring the time and operation of the databack microprocessor 36. The databack microprocessor 36 controls the output systems as described below.

Initially, the databack microprocessor 36 displays the display data by driving the LCD 7. Details of the display segments in the LCD 7 Will be discussed hereafter, but the LCD 7 shown in FIG. 3 displays the copyright symbol, the year, and the user's name. Furthermore, the databack microprocessor 36 displays the year data and the name data by causing segment 42 to emit light in correspondence with the display timing signal described above. We will now explain details of these actions.

The flip flop circuit 38 records which state the databack microprocessor 36 is in, i.e. whether it is still in its initialized or first state following operation of the reset circuit 39 when the battery 35 was installed, or if the time has been corrected by simultaneous operation of the operation buttons 18 and 19 to place it into the second state.

Operation of the reset circuit 39 as described above is not restricted to when the battery 35 is replaced, but also occurs when static electric noise enters and when the battery 35 becomes separated from the connectors it contacts for an instant. When the reset circuit 39 acts, the output of the flip flop circuit 38 is set to logic low "L", and this is transmitted to the databack microprocessor 36. Through this logic low signal, the databack microprocessor 36 determines that it is still in the initial or first state.

The databack switch detection circuit 37 detects when the operation buttons 18 and 19 are simultaneously pushed as described above. Operation of the operation buttons 18 and 19 means that the year data has been adjusted. Most of the time, the user presses the operation buttons 18 and 19 after replacing the battery in order to adjust the year data to the correct year. It is possible to determine if the set time data is correct by detecting the operation of the operation buttons 18 and 19. Accordingly, when the operation buttons 18 and 19 are operated, the output of the databack switch detection circuit 37 is transmitted to the flip flop circuit 38, thereby reversing the output of the flip flop circuit 38 to a logic high (H). The databack microprocessor 36 determines that the year data has been set to the correct year when it recognizes this logic high signal.

Figure 4:
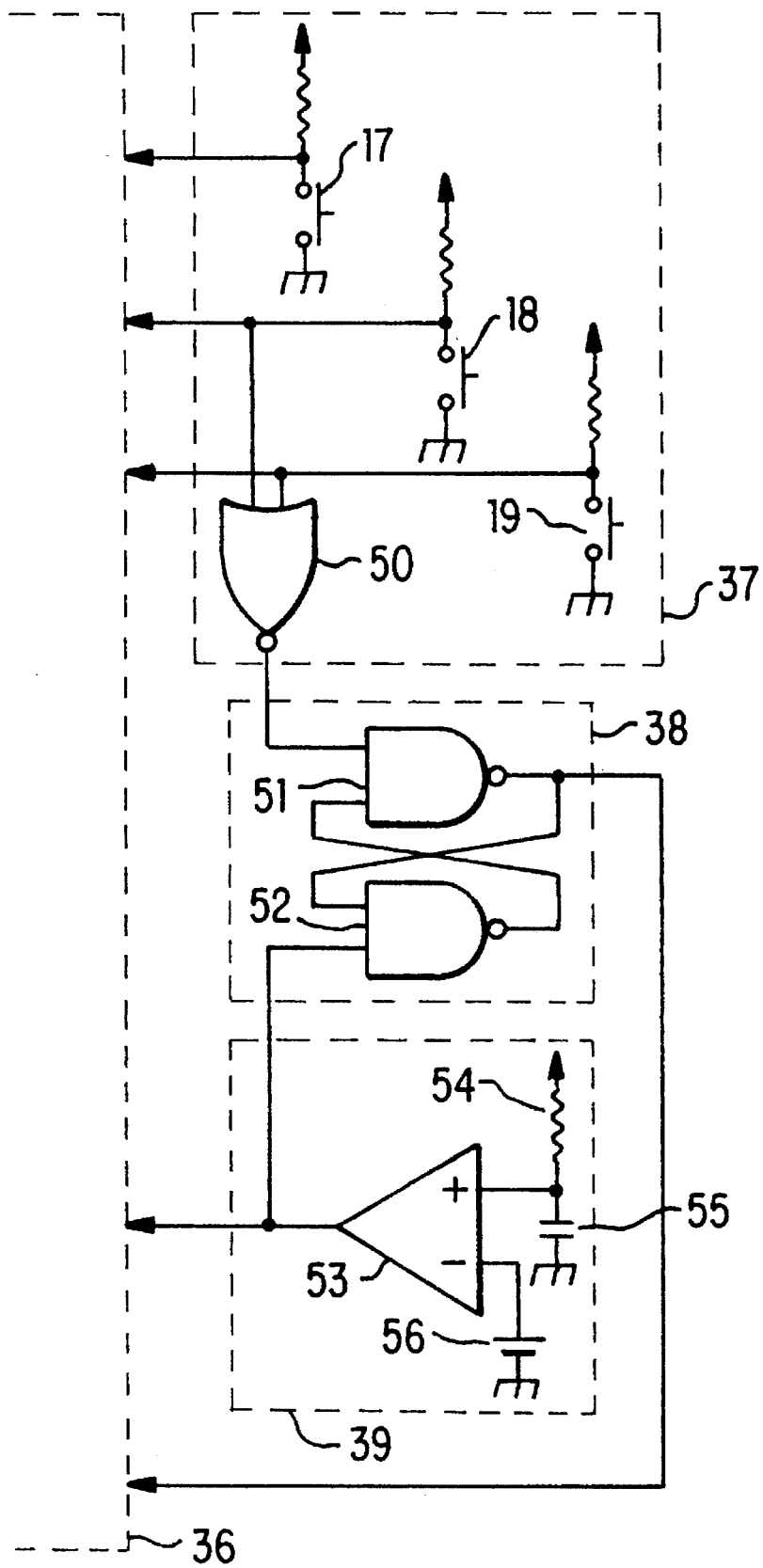
FIG. 4 is a schematic diagram showing the first preferred embodiment of the data recording system.

FIG. 4 is a circuit diagram illustrating the databack switch detection circuit 37, the flip flop circuit 38 and the reset circuit 39. The data back switch detection circuit 37 and the flip-flop circuit 38 form a discriminating circuit.

In FIG. 4, the three operation buttons 17, 18 and 19 are part of the switch detection circuit 37, and each of these is independently connected to the databack microprocessor 36. As described above, the name data can be altered by pressing operation button 19 while pressing operation button 17, and the year data can be altered by pressing operation button 19 while pressing operation button 18. The signals from the operation buttons 18 and 19 are also input into a NOR gate 50. The NOR gate 50 outputs a logic high signal only when both of the operation buttons 18 and 19 are operated simultaneously, in other words, only when the year data is altered. The output of the NOR gate 50 is transmitted to a NAND gate 51 that partially comprises the flip flop circuit 38.

The flip flop circuit 38 is composed of two NAND gates 51 and 52. The output of the first NAND gate 51 is set to logic high when the input signal to the first NAND gate 51 is logic high and the input signal to the second NAND gate 52 is logic low. In addition, it is set to logic low when the input signal to the first NAND gate 51 is logic high and the input signal to the second NAND gate 52 is logic high. The output of the first NAND gate 51 is transmitted to the databack microprocessor 36.

The reset circuit is composed of a comparator 53, a reference voltage source 56, a resistor 54 and a capacitor 55. During the rise in voltage immediately after a new battery 35 is loaded into the databack, the voltage at the connection between the resistor 54 and the capacitor 55 is low, so the output of the comparator 53, which compares resistor voltage to the voltage of the reference voltage source 56, becomes logic low. This output is transmitted to the databack microprocessor 36, which resets the databack microprocessor 36. Because of this, the databack microprocessor 36 begins to execute its pre-installed program from the start.

The output of the comparator 53 is also connected to the second NAND gate 52. Because the output of the comparator 53 is logic low and the output of the AND gate 50 is logic high, the output of the first NAND gate 51 is logic low. This is also transmitted to the databack microprocessor 36.

Some time later, when the voltage has finished rising, the output of the comparator 53 reverses to logic high. Since the output of the comparator 53 is also connected to the second NAND gate 52, the logic high signal is input to the second NAND gate 52. In this state, when the operation buttons 18 and 19 are simultaneously pressed and the year data is altered, the AND gate 50 outputs a logic low signal to the first NAND gate 51. Because a logic low signal is input to the second NAND gate 52, as described above, the output of the first NAND gate 51 remains a logic low signal, which is transmitted to the databack microprocessor 36.

Through the process described above, the output of the first NAND gate 51 is set to a logic low signal by the output of the comparator 53 when the battery 35 is loaded, and is reversed to a logic high signal when the operation buttons 18 and 19 are pressed. The databack microprocessor 36 remains in the reset state if the output of the NAND gate 51 is logic low. Thus, the databack microprocessor 36 is released from the reset state and recognizes that correction of the year data has occurred if the output of the first NAND gate 51 is logic high.

Figure 5:
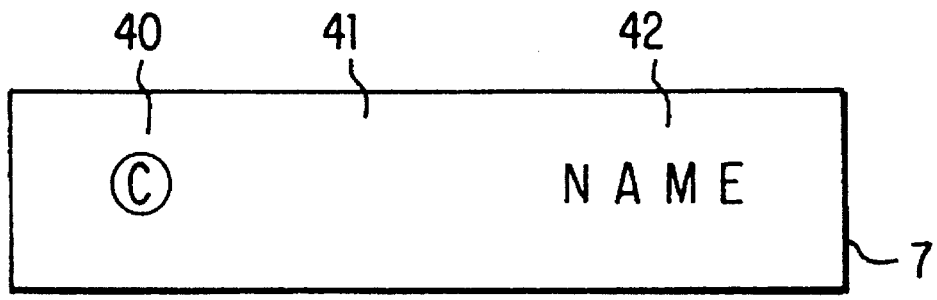
FIG. 5 is a front view showing the first preferred embodiment of the data recording system.
Figure 6:
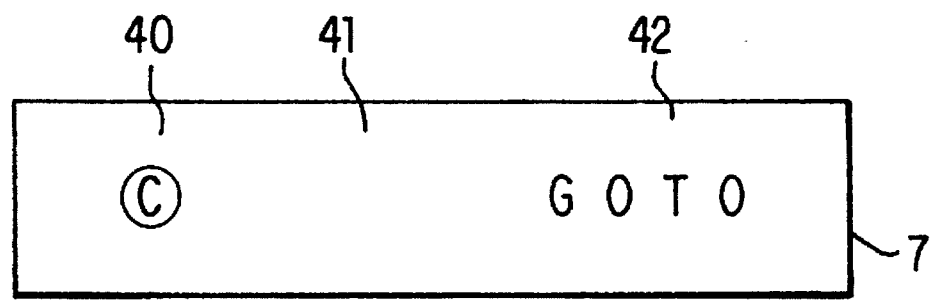
FIG. 6 is a front view showing the first preferred embodiment of the data recording system in an intermediate state.
Figure 7:
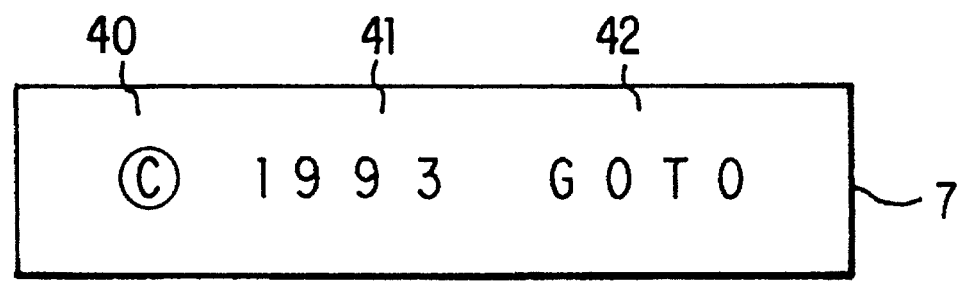
FIG. 7 is a front view showing the first preferred embodiment of the data recording system in the second state.

FIGS. 5 through 7 show various examples of the display made by the LCD 7. FIG. 5 shows the display of the LCD 7 immediately after the databack microprocessor 36 has been initialized or reset. The illustration in FIG. 5 occurs immediately following initialization of the databack microprocessor 36 when the battery is replaced, when the operations of setting the year data and name data have not yet been performed. Accordingly, segment 41, which is used for the year data, is blank, and segment 42, which is used for name data, displays the word "NAME" to encourage setting of the name.

When a photograph is taken and a display signal is produced with the system in this state, data is displayed exactly as is shown in the example display. Because nothing is recorded regarding the year data, the problem of incorrect data being recorded does not occur. In order to encourage setting of the year data, it would also be possible to display "YEAR" in segment 41, and it would also be possible to display "????" in both segments 41 and 42 to encourage caution.

In addition, with segment 42, which is used for name data, it is possible to flash "NAME" to encourage setting of the name data, and for no name data to be recorded either when a display signal is produced.

FIG. 6 shows the contents of the display made by the LCD 7 after only the name data "Goto" has been set. Because no year data has been set yet in this figure either, segment 41 is blank and data is displayed exactly as is shown in the example display when a photograph is taken.

FIG. 7 shows the display made by the LCD 7 in a condition when all settings have been made, including the year data (1993). In FIG. 7, all of the display segments (40–42) show currently correct displays.

In FIGS. 5 through 7, the symbol mark ©, which indicates a copyright, is always displayed by segment 40, and this mark is displayed and recorded regardless of the state of the system.

Figure 8:
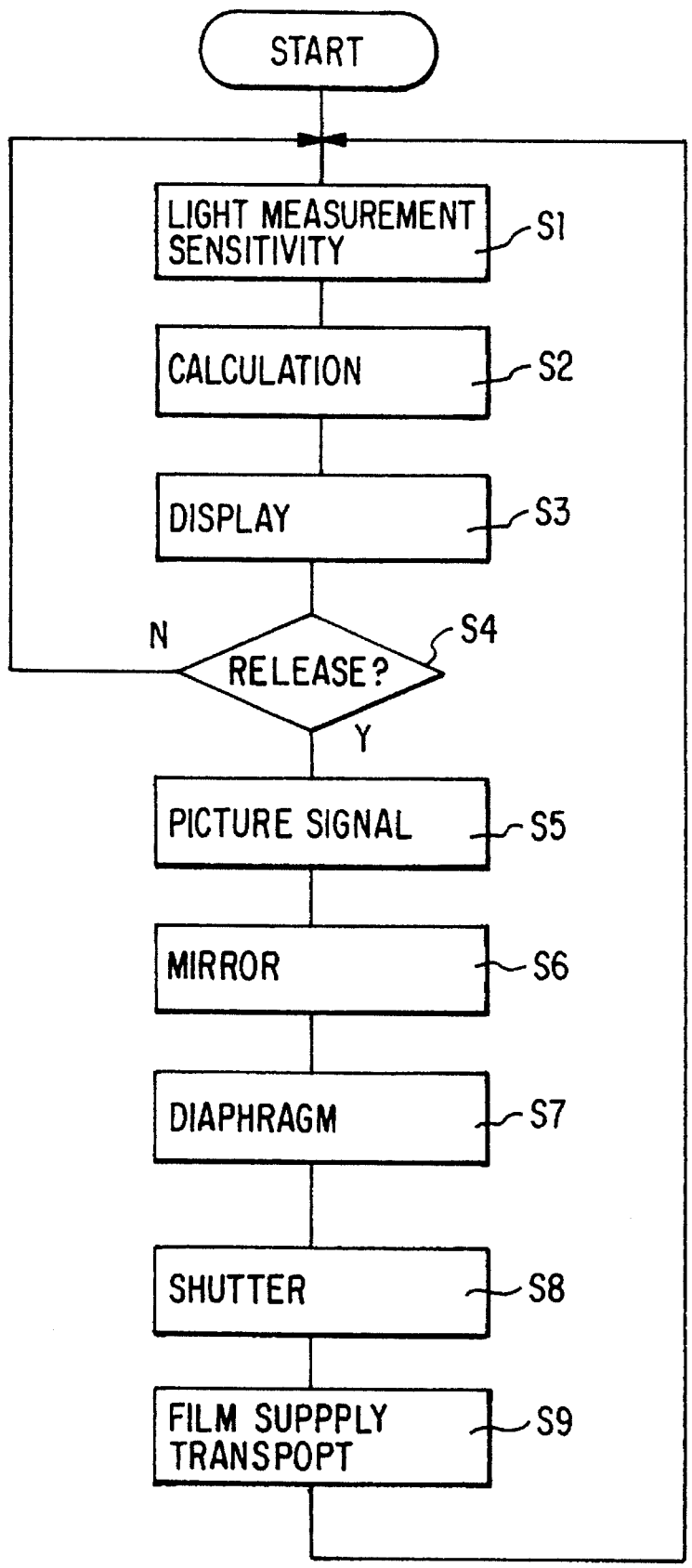
FIG. 8 is a flowchart showing the operation of the first preferred embodiment of the camera microprocessor of the data recording system.

FIG. 8 is a flowchart showing the process routine followed by the camera microprocessor 24 shown in FIG. 3. This routine is repeatedly executed when power is supplied to the camera microprocessor 24.

When the routine starts, in step S1, the camera microprocessor 24 receives a photometry signal from the photometry circuit 21 and a sensitivity signal from the sensitivity detection circuit 22. In step S2, the camera microprocessor 24 uses both of these signals to calculate the shutter time and stop value for the appropriate exposure conditions. In step S3, the exposure conditions found above and the photography modes set by the various switch state detection circuits 23 are displayed on the LCD 25. In step S4, the camera microprocessor 24 determines via the switch state detection circuits 23 whether or not the release button 4 has been depressed. If it is not depressed, the camera microprocessor 24 returns to step S1 and repeats the process described above. If it is determined that the release button is depressed in step S4, the CPU moves to step S5.

In step S4, in addition to determining whether or not the release button 4 has been depressed, it is also possible for the camera microprocessor to determine the setting condition of the databack 5, and to return to step S1 without performing the release operations of steps S5 et al. when the databack is in the first state suppressing the display of date and time data, thereby also preventing the taking of a photograph. This can include the situation when the databack microprocessor 36 is being maintained in the reset state, when the year data has not been set.

In step S5, the transistor 29 is switched on for a set time, a timing signal is output to the databack 5 via the connections 13 and 16, and operation of the data display is ordered. In step S6, a partially reflective mirror is raised and moved out of the photo light path. In step S7, the diaphragm 27 is controlled so that it forms the specified aperture opening. In step S8, exposure of the film is controlled by opening and closing the shutter means 26. Then, because the exposure operation has been concluded, in step S9 the motor 28 rotates in the forward direction, thereby scrolling the film and executing the power-added operations.

The camera microprocessor 24 now returns to step S1 and repeats the process described above because at this point a single exposure action has been completed.

Figure 9:
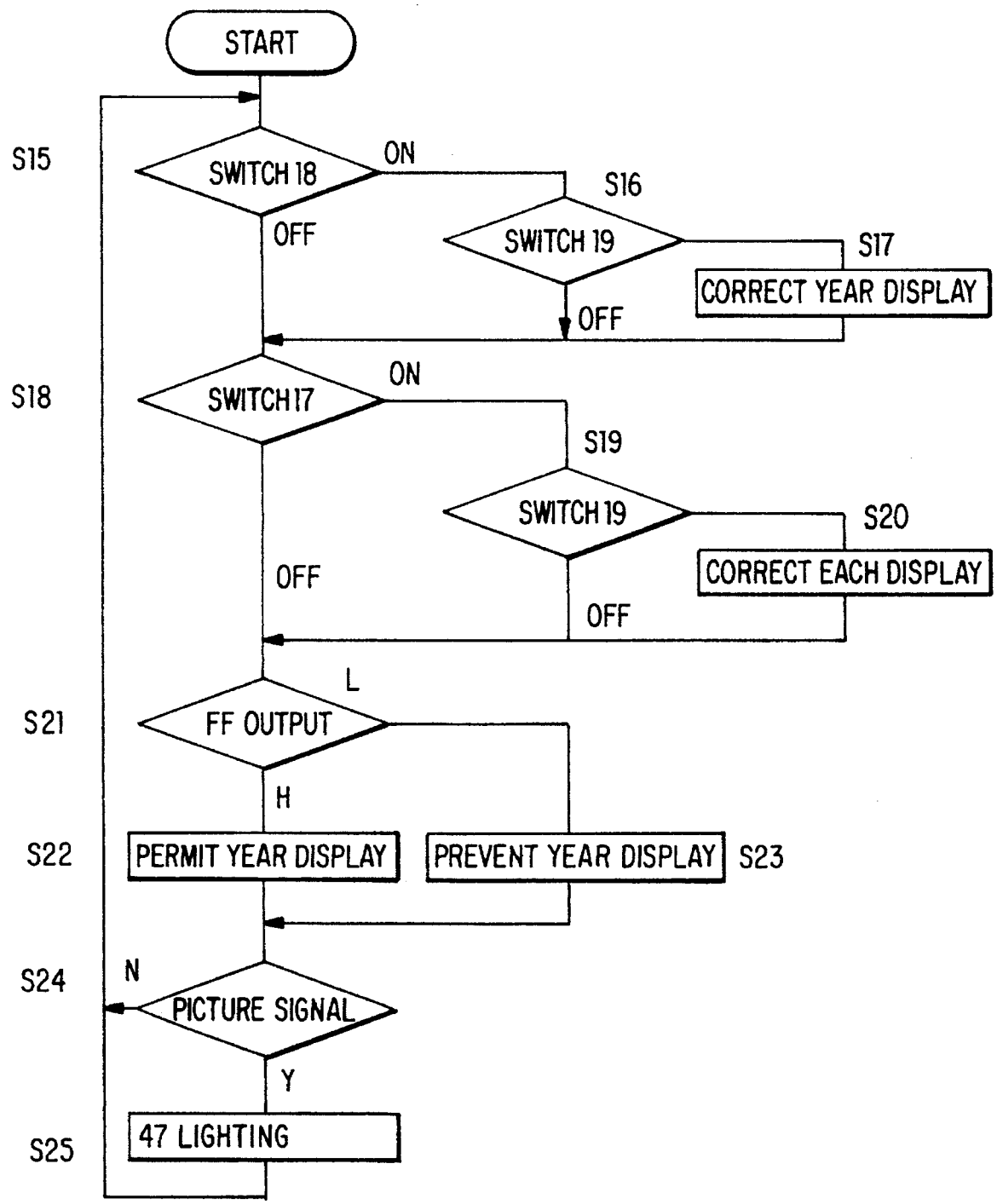
FIG. 9 is a flowchart showing the operation of the first preferred embodiment of the data recording system.

FIG. 9 is a flowchart showing the process routine followed by the databack microprocessor 36. This routine is repeatedly executed when power is supplied to the databack microprocessor 36, but to make this explanation easier, explanation of the function which counts the output of the oscillator 44 and updates the time data has been omitted. The following explanation assumes that this is performed continually, in the well known manner.

When the routine starts, in step S15 the databack microprocessor 36 determines whether or not operation button 18 is depressed. If operation button 18 is depressed, the databack microprocessor 36 moves to step S16, and if operation button 18 is not depressed, the databack microprocessor 36 moves to step S18.

In step S16, the databack microprocessor 36 determines whether or not operation button 19 is depressed. If operation button 19 is depressed, the databack microprocessor 36 moves to step S17, and if operation button 19 is not depressed, the databack microprocessor 36 moves to step S18. In step S17, because both operation buttons 18 and 19 are depressed simultaneously, the year data correction mode is executed. Simultaneous with this, the flip flop circuit 38 sends a logic low signal to the databack microprocessor 36, as was explained in FIG. 4.

In step S18, the databack microprocessor 36 determines whether or not operation button 17 is depressed. If operation button 17 is depressed, the databack microprocessor 36 moves to step S19, and if operation button 17 is not depressed, the databack microprocessor 36 moves to step S21.

In step S19, the databack microprocessor 36 determines whether or not operation button 19 is depressed. If operation button 19 is depressed, the databack microprocessor 36 moves to step S20, and if operation button 19 is not depressed, the databack microprocessor 36 moves to step S21. In step S20, because both operation buttons 17 and 19 are depressed simultaneously, the name data correction mode is executed.

In step S21, the signal from the flip flop circuit 38 is read. If it is determined that the signal from the flip flop circuit 38 is a logic high signal, in other words, if it is determined that the system is in a condition with the year data adjusted by means of simultaneous operation of operation buttons 18 and 19 in step S17, the year display is performed by segment 41 (step S22), and the databack microprocessor 36 moves to step S24. If it is determined that the signal from the flip flop circuit 38 is a logic low signal, it is determined from this that the system is in a condition with the year data not adjusted, and because of this segment 41 is left in a disabled state (step S23), and the databack microprocessor 36 moves to step S24.

Besides leaving segment 41 in a disabled state, it is also possible to produce a warning to the photographer in step S23. As a warning, one alternative is to sound audible warning in addition to having a flashing display of the string of characters "DATE." In addition, in step S4 described above (FIG. 8), when the setting condition of the databack 5 is determined and the mode suppressing display of the date and time data is executed, and when the databack microprocessor 36 returns to step S1 without performing the release operations after step S5, thereby preventing the taking of a photograph, it is also possible to notify the camera 1 in step S23 of the setting condition of the databack 5.

In step S24, the databack microprocessor 36 determines from the signal state of the connection 16 whether or not a display timing signal from the camera 1 has been received. If such a display timing signal has not been generated, the databack microprocessor 36 returns to step S15 and repeats the process described above. If a display timing signal has been generated, the LED array 47 is driven based on the date and time data, the data is recorded on the surface of the film (step S25), and the databack microprocessor 36 then returns to step S15 and repeats the process described above.

With the process described above, step S23 is executed after the databack microprocessor 36 has been reset and until the year data is adjusted by means of the operation buttons 18 and 19. Because of this, the year data is not displayed by segment 42, and incorrect year data is not displayed by the LED array 47. At this time, the copyright symbol © is always displayed by segment 40, and this mark is displayed and recorded regardless of the state of the system.

Figure 10:
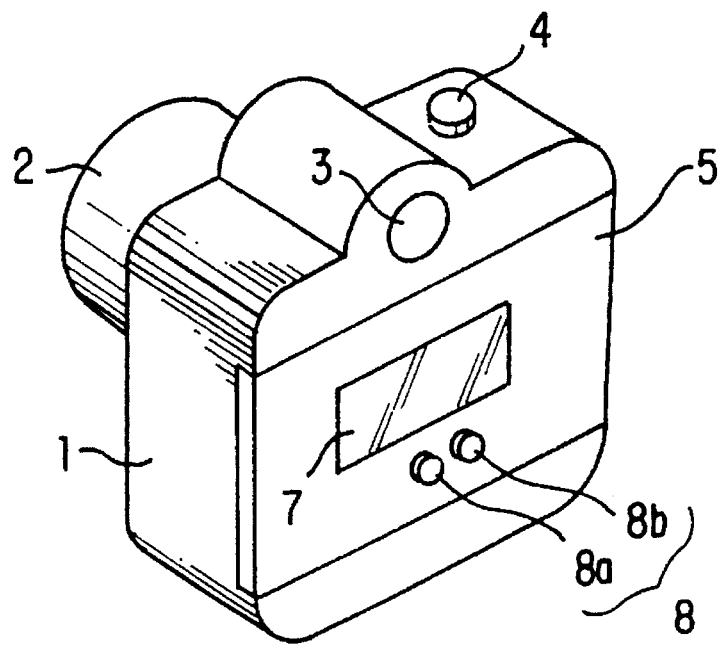
FIG. 10 is an angled view showing the second preferred embodiment exterior of a databack mounted on a camera.

A second preferred embodiment, which is used when it is not necessary to record a copyright symbol or the photographic name on the photograph, is shown in FIGS. 10–15. In FIG. 10, the camera and databack are essentially the same as in FIGS. 1–9. However, as shown, the operation buttons 8 comprise only two buttons 8a and 8b.

Initially, the on or off status of the several operation buttons 8 described above are input from the switch detection circuit 37. Time data including the year, month and day to be recorded can be adjusted by the settings of these operation buttons 8. Furthermore, a display timing signal is input via the connection 13 and 16. The output of the switch detection circuit 37 is also transmitted to the flip flop circuit 38. The data back switch detection circuit 37 and the flip-flop circuit form a discriminating circuit. Initially, the databack microprocessor 36 displays the display data by driving the LCD 7. In the LCD 7, segment 40 displays the year, month and day, and segment 41 displays a warning. The databack microprocessor 36 displays the data related to the year, month and day by causing the LED array 42 to emit light in correspondence with the display timing signal described above.

Figure 11:
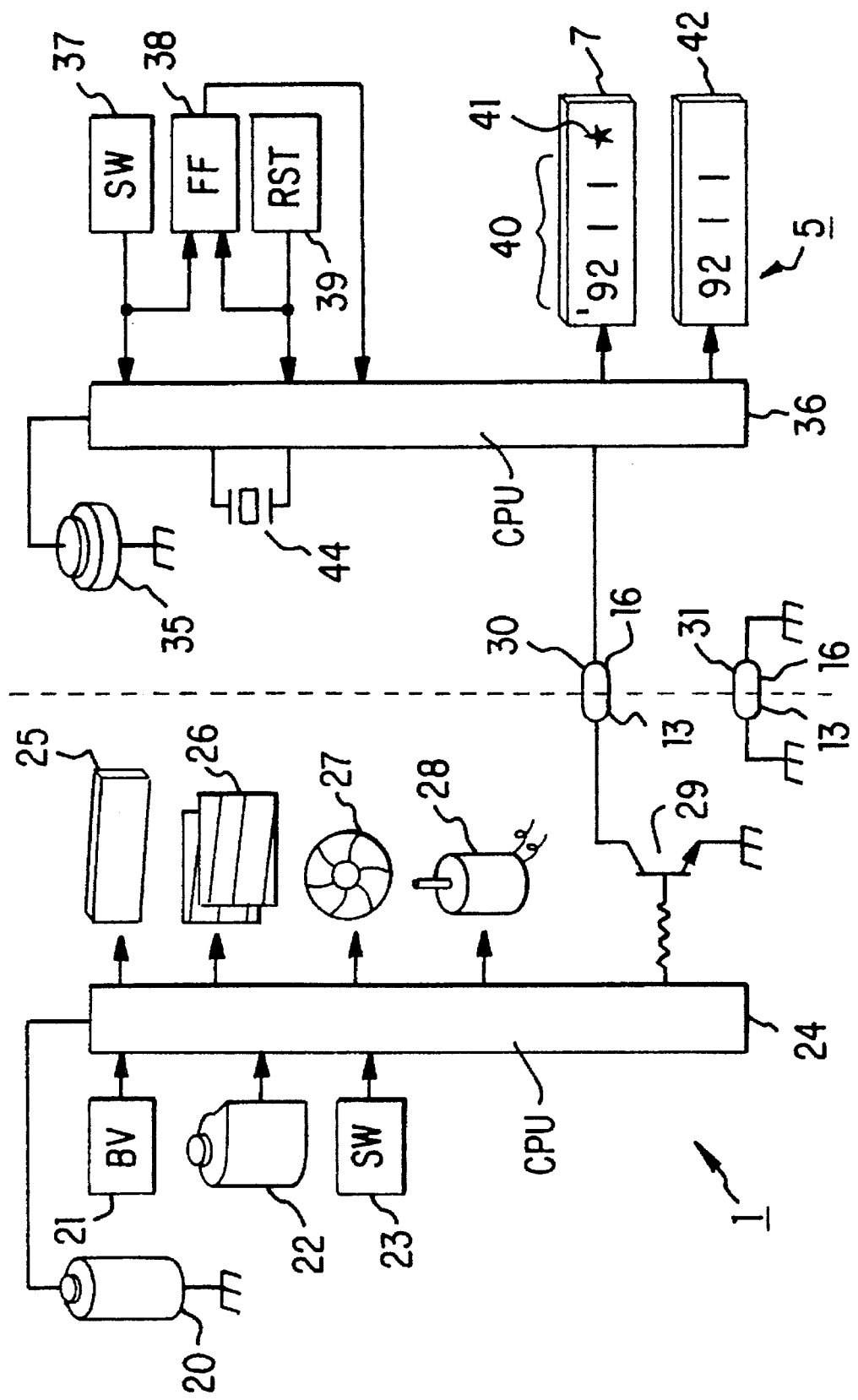
FIG. 11 is a block diagram showing the electrical circuits of the second preferred embodiment of the camera and databack.
Figure 12:
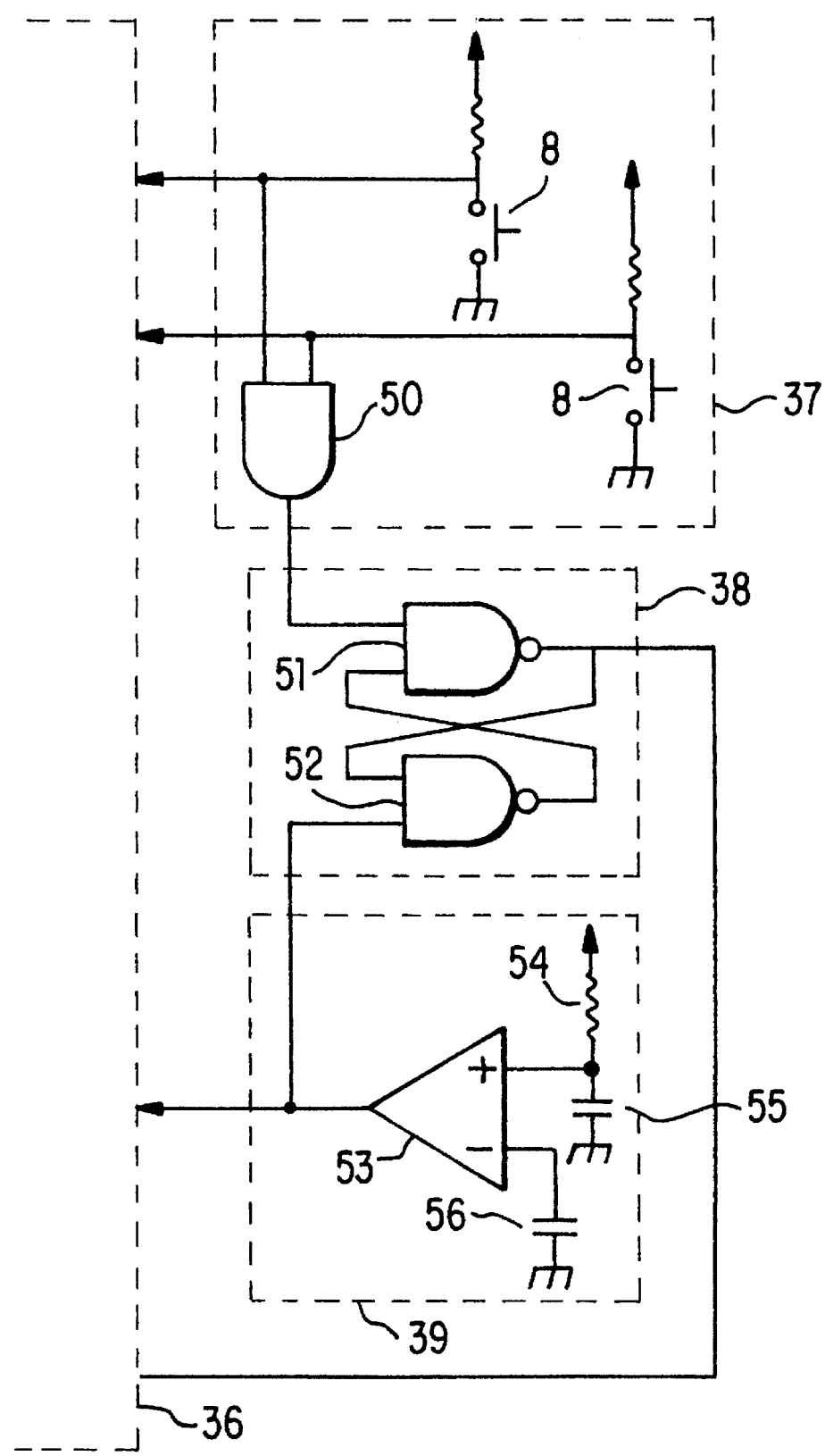
FIG. 12 is a schematic diagram of the circuitry of the switch detection circuit, the FF circuit and the reset circuit of the second preferred embodiment.

As in the first preferred embodiment of the system, operation of these operation buttons 8 means the time data has been adjusted. Most of the time, the user presses these operation buttons 8 after replacing the battery in order to adjust the time data to the correct time, but it is possible to determine if the set time data is correct by detecting the operation of these operation buttons 8. However, as shown in FIG. 11, the displays 40 and 41 differ from the displays 47. Further, as shown in FIG. 12, the buttons 8a and 8b are connected to the flip-flop circuit 38 in a slightly different configuration.

As shown in FIG. 11, the two operation buttons 8a and 8b are provided in the switch detection circuit 37, and each of these is independently connected to the databack microprocessor 36. Furthermore, these are connected to an AND gate 50, and this AND gate 50 outputs the logic low signal when even one of the operation buttons 8 is on. The output of this AND gate 50 is transmitted to the NAND gate 51 which partially comprises the FF circuit 38. The FF circuit 38 is composed of a flip flop circuit made of two NAND gates 51 and 52. After reset, the output of the first NAND gate 51 is set to logic high and is input to the second NAND gate 52, and the input to the first NAND gate 51 is set to logic low.

During the rise in voltage immediately after a battery 35 is loaded, the voltage at the point between the resistor 54 and the capacitor 55 is low in comparison to the voltage of the reference voltage source 56, so the output of the comparator 53 becomes logic low. This output is transmitted to the databack microprocessor 36, which sets the databack microprocessor 36 its initial or first state. Because of this, the databack microprocessor 36 begins to execute its pre-installed program from the start. Some time later, when the voltage has stopped rising, the output of the comparator 53 reverses to logic high. The output of the comparator 53 as described above is also connected to the second NAND gate 52.

Through the structure described above, the NAND gate 51 is set to logic low by the output of the comparator 53 when the battery 35 is loaded, and is reset to logic high when the operation buttons 8 are pressed. The databack microprocessor 36 remains in the reset state if the output of the NAND gate 51 is logic low, and recognizes the operation buttons 8 have been pushed if the output is logic high.

Figure 13:
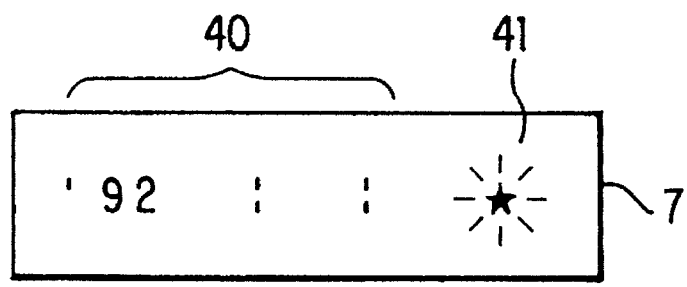
FIG. 13 shows the LCD segment display during the warning state for the second preferred embodiment.

FIG. 13 shows the display 7 in the first state for the second preferred embodiment. With the databack 5, the initial value of the first state of the time data is Jan. 1, 1992 as shown in segment 40, and flashing by segment 41 indicates the time data displayed by segment 40 is the initial value. The purpose of the flashing by segment 41 is to encourage the user to adjust the time data. If the operation buttons 8 are not operated, the display of this time data is changed as time is measured from this initial value. At this time, operation of the display is disabled so the LED array 42 does not emit light, thereby preventing the display of erroneous time data.

Figure 14:
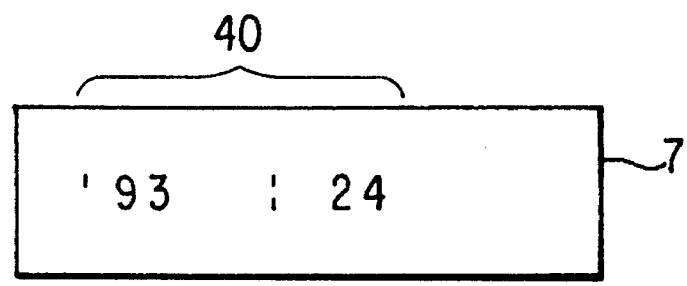
FIG. 14 shows the LCD segment display during normal operation for the second preferred embodiment.

FIG. 14 is an example of the display when the operation buttons 8 have been operated to adjust the time to the correct time after the condition shown in FIG. 5. Through operation of the operation buttons 8, the display by segment 40 becomes Jan. 24, 1993, and the warning in segment 41 is extinguished. At the same time, the disabling of the emitting of light by the LED array 42 is lifted, so the time data is displayed and recorded on the film in accordance with the input of the timing signal as discussed above.

FIG. 8 also shows the process routine of the camera microprocessor 24 inside the camera 1 which is shown in FIG. 11, which is the same as for the camera 1 shown in FIG. 1. This routine is repeatedly executed when power is supplied to the camera microprocessor 24 in both the first and second preferred embodiments.

Figure 15:
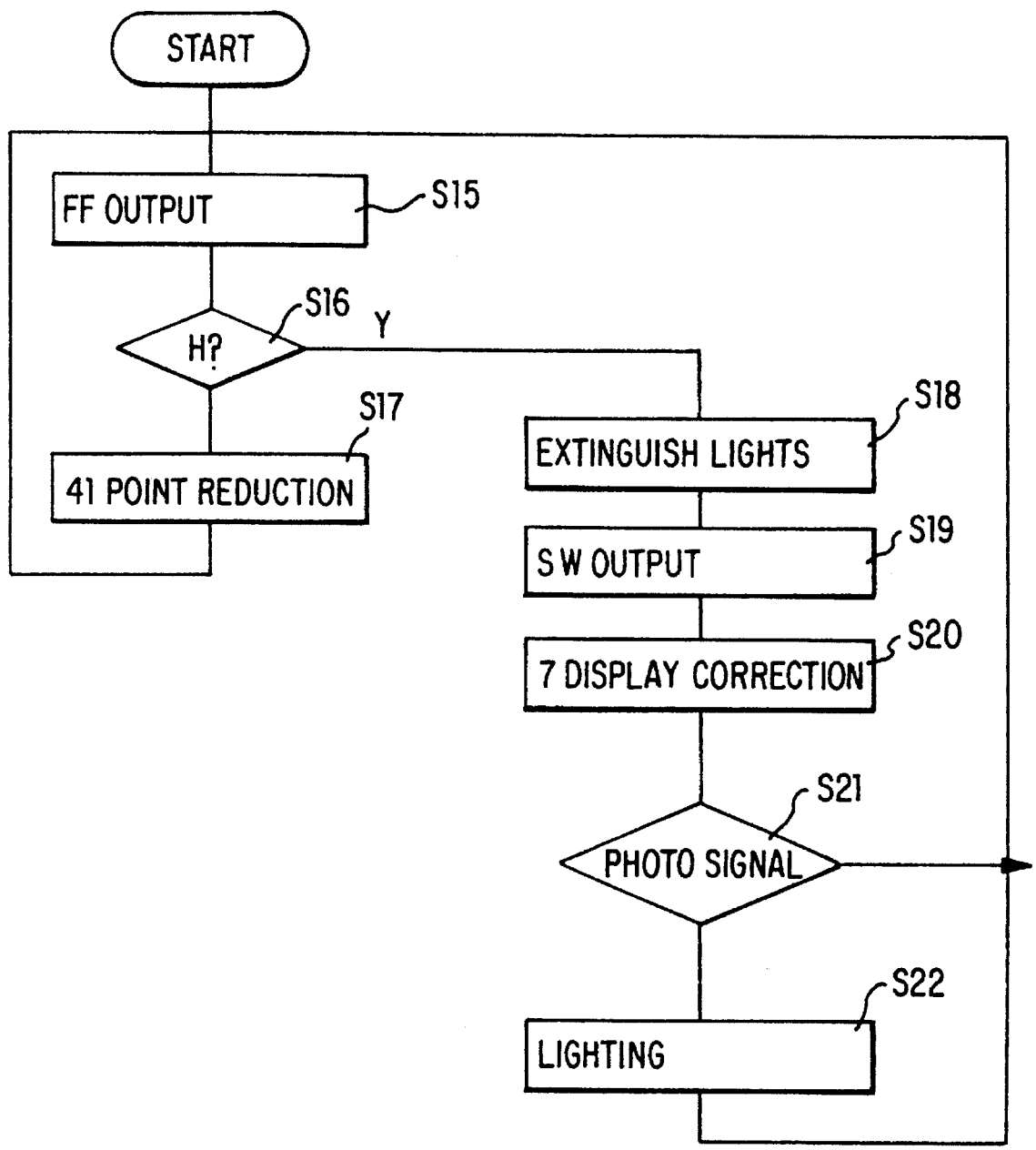
FIG. 15 shows a flow chart of the process routine followed by the microprocessor in the databack for the second preferred embodiment.

FIG. 15 shows an example of a process routine of the microprocessor 36 inside the databack 5 which is shown in FIG. 11.

This routine is repeatedly executed when power is supplied to the databack microprocessor 36. The routine is described assuming the calendar function is always functioning in the well known manner.

First, in Step S15, the databack microprocessor 36 reads the signal from the FF circuit 38.

Then, in Step S26, the databack microprocessor 36 determines what the state of the signal from the FF circuit 38.

Next, in Step S17, if the databack microprocessor 36 determines that the signal from the FF circuit 38 is a logic low signal (in other words the time data has not been adjusted by operating the buttons 8), the segment 41 is caused to flash. Subsequently, the databack microprocessor 36 returns to step S25 and repeatedly executes the process described above, which is repeated as long as the operation buttons 8 have not been pressed.

Then, in Step S18, if the databack microprocessor 36 determines that the signal from the FF circuit 38 is a logic high signal (in other words if the time data has been adjusted by operating buttons 8), segment 41 is extinguished.

Next, in step S19, the output signals from the switch detection circuits 37 are read.

In Step S30, when the databack microprocessor 36 determines from the signals from the switch detection circuits 37 that the operation buttons 8 have been depressed and the time data has been being adjusted, the time display by the LED 7 is adjusted.

Next, in Step S21, the databack microprocessor 36 determines from the state of the terminal 30 whether or not a display timing signal has been received from the camera 1. In the event the display timing signal has not been generated, the databack microprocessor 36 returns to step S25 and repeats the above process.

Finally, in Step S22, if a display timing signal is received, the LED array 42 is driven based on the time data, and the data is displayed on the surface of the film.

With the process described above, the databack microprocessor 36 executes only the routine from step S15 to step S17 after the databack microprocessor 36 has been reset and before the time is adjusted by means of the operation buttons 8, and because of this only the warning by the flashing of segment 41 is performed. In addition, because the databack microprocessor 24 does not move to step S28, the LED array 42 does not display incorrect time data.

With this kind of structure, when it is detected that the databack microprocessor 36 inside the databack 5 has been reset and the time data has been set to its initial or first state due to replacement of the battery or momentary separation from the battery connection, a display warning is first performed to alert the user and at the same time display of incorrect time data is prevented. A warning is provided on the display when the time data reverts back to its initial value. Because of this, the operator is able to recognize that adjustment is needed. Furthermore, because the time data is not displayed on the film when it has reverted back to its initial value, marring of the film through the display of outdated time information is also prevented.

These embodiments were explained using the example of a steel camera which uses silver salt film, but this invention is not limited to this case but can also be applied to devices in which time data and character data can be recorded on a different recording medium by a different recording method, including video cameras and steel cameras which use semiconductor memories such as IC cards or magnetic recording media such as disks or tape.

With a data recording system using this invention as described above, it is possible to eliminate conditions that make copyright assertion impossible by preventing the display of incorrect date and time data while making it so that data related to copyrights is always displayed, because when the system detects that the databack microprocessor inside the databack 5 (data recording system) has been reset and that the date and time data have been set to their initial values, display of the unadjusted time and date data is suppressed while preset data such as data related to copyrights is recorded.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A data recording device for a camera, the data recording device recording information on a recording medium of the camera, the information including at least one of preset data, name data, date data and time data; the data recording device comprising:

a timer circuit generating the time data and the date data;

a display device displaying the information;

a recording circuit recording the information on the recording medium;

a clock circuit supplying clock pulses;

a power supply supplying power to the data recording device;

a logic circuit connected to the control circuit;

a control circuit controlling the timer circuit, the display device and the recording circuit, the control circuit outputting the information to the display device and to the recording circuit based on the state of the logic circuit;

a reset circuit, wherein the reset circuit places the logic circuit into a first state after an interruption of the power from the power supply; and a plurality of switches, wherein operation of a first subset of the plurality of switches places the logic circuit into a second state.

2. The data recording device of claim 1, wherein when the logic circuit is in the first state, the control circuit outputs a limited subset of the information to the recording circuit.

3. The data recording device of claim 2, wherein the limited subset of the information does not include the date and the time data.

4. The data recording device of claim 3, wherein the limited subset of the information does not include the name data.

5. The data recording device of claim 2, wherein the control circuit outputs a warning signal to the display device.

6. The data recording device of claim 2, wherein the display device has a display, the display comprising at least one of a preset data display portion, a name data display portion, a time data display portion, a date data display portion and a warning signal display portion.

7. The data recording device of claim 6, wherein when the logic circuit is in the first state, the date data portion is blank.

8. The data recording device of claim 6, wherein when the logic circuit is in the first state, the name portion is blank.

9. The data recording device of claim 6, wherein when the logic circuit is in the first state, the warning portion displays a warning symbol.

10. The data recording device of claim 1, wherein when the logic circuit is in the first state, the control circuit is held in a reset state.

11. The data recording device of claim 1, wherein when the logic circuit is in the first state, the control circuit disables operation of the camera.

12. A method for controlling a data recording system for recording information onto a recording medium of a camera, the information including at least one of preset data, name data, date data and time data, the method comprising the steps of:

generating the date data and the time data from a set time;

setting the set time to a predetermined initial time upon an interruption of a power supply to the data recording system;

placing a logic circuit of the data recording system into a first state upon the interruption of the power supply;

resetting the set time to a desired time;

placing the logic circuit of the data recording system into a second state upon resetting the set time;

determining the state of the logic circuit of the data recording system; and controlling the information to be recorded on the recording medium based on the determined state.

13. The method of claim 12, wherein when the data recording system is in the first state, the information to be recorded does not include the time data and the date data.

14. The method of claim 12, wherein when the data recording system is in the first state, the information to be recorded does not include the name data.

15. The method of claim 12, further comprising the steps of:

setting the name data to predetermined initial name data upon the interruption of the power supply; and resetting the name data to desired name data.

16. The method of claim 12, further comprising the step of controlling operation of the camera based on the state of the data recording system.

17. The method of claim 16, wherein when the data recording system is in the first state, operation of the camera is suspended.

18. The method of claim 12, further comprising the step of displaying the information.

19. The method of claim 18, wherein when the data recording system is in the first state, the date and time data is not displayed.

20. The method of claim 18, wherein when the data recording system is in the first state, a warning symbol is displayed.

21. A data recording device for recording information onto a recording medium of a camera, the information including at least one of preset data, name data, date data and time data, the data recording device comprising:

clock means for generating the time data and date data based on set time data and set date data;

storage means for storing set name data;

setting means for setting at least one of the name data, the time data and the date data;

display means for displaying the information;

recording means for recording the information onto the recording medium;

power supply means for supplying power to the data recording device;

reset means for resetting the set name data, time data and date data to an initial name, time and date data upon an interruption of the power supplied from the power supply means; and control means for controlling the clock means, setting means, display means and recording means, wherein a logic circuit connected to the control means is placed into a first state after an interruption of the power supply means and wherein the logic circuit connected to the control means is placed into a second state after operation of the setting means to set the time and date data.

22. The data recording device of claim 21, wherein when the control means is in the first state, the control means outputs only a limited subset of the information to the recording means.

23. The data recording device of claim 22, wherein the limited subset of the information does not include the time data and the date data.

24. The data recording device of claim 22, wherein the limited subset of the information does not include the name data.

25. The data recording device of claim 21, wherein, when the control means is in the first state, the control means outputs a warning signal to the display means, the display means displaying a warning when a warning signal is output by the control means.

26. The data recording device of claim 21, wherein when the control means is in the first state, the control circuit disables operation of the camera.

27. An apparatus comprising:

a control circuit;

a timer circuit generating time data, said timer circuit outputting said time data to said control circuit;

a power supply supplying power to said control circuit and said timer circuit;

a reset circuit detecting a condition of said power supply and generating a reset signal to at least one of said control circuit and said timer circuit when the condition of said power supply corresponds to a predetermined condition;

a discriminating circuit generating an output signal based on said reset signal and inputs from a user;

a warning circuit generating a warning signal when said discriminating circuit generates said output signal.

* * * * *